US012282896B1

(12) United States Patent
Ryan et al.

(10) Patent No.: US 12,282,896 B1
(45) Date of Patent: Apr. 22, 2025

(54) COLLABORATIVE PLANNING SYSTEM

(71) Applicant: Palantir Technologies Inc., Denver, CO (US)

(72) Inventors: Alexander Ryan, Denver, CO (US); Adam Storr, San Francisco, CA (US); Cassandra Wang, Breckenridge, CO (US); Daniel Cervelli, Wanaka (NZ); David Skiff, Iowa City, IA (US); Kurt Campbell, Southern Pines, NC (US); Kendra Knittel, Denver, CO (US); Michael Lumley, North Arlington, VA (US); Richard Eben, Arlington, VA (US); Tyler Siegel, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 227 days.

(21) Appl. No.: 17/570,865

(22) Filed: Jan. 7, 2022

Related U.S. Application Data

(60) Provisional application No. 63/147,073, filed on Feb. 8, 2021.

(51) Int. Cl.
*G06Q 10/10* (2023.01)
*G06F 3/04847* (2022.01)

(52) U.S. Cl.
CPC ....... *G06Q 10/103* (2013.01); *G06F 3/04847* (2013.01)

(58) Field of Classification Search
CPC .......................... G06Q 10/103; G06F 3/04847
See application file for complete search history.

(56) References Cited

U.S. PATENT DOCUMENTS

| | | | |
|---|---|---|---|
| 8,732,026 B2 | 5/2014 | Caballero et al. | |
| 8,738,414 B1 | 5/2014 | Nagar et al. | |
| 9,953,339 B2 | 4/2018 | Allen et al. | |
| 10,579,649 B2 | 3/2020 | Visscher | |
| 11,271,983 B2 | 3/2022 | Chegini | |
| 11,805,091 B1 | 10/2023 | Rapaport et al. | |
| 2005/0039119 A1* | 2/2005 | Parks | G06F 40/174 715/209 |
| 2007/0233534 A1* | 10/2007 | Martin | G06Q 10/06 705/301 |
| 2008/0059539 A1* | 3/2008 | Chin | G06Q 10/10 707/999.203 |
| 2012/0060162 A1* | 3/2012 | Hunt | G06Q 10/06 718/102 |
| 2013/0151421 A1* | 6/2013 | Van Der Ploeg | G06Q 10/06 705/301 |
| 2014/0282199 A1* | 9/2014 | Basu | G06F 3/0484 715/772 |
| 2017/0220546 A1* | 8/2017 | Codrington | G06F 16/2282 |
| 2018/0018409 A1* | 1/2018 | Peters | G06F 16/29 |
| 2019/0171837 A1* | 6/2019 | Thoren | G06F 16/252 |

* cited by examiner

*Primary Examiner* — John T Repsher, III
(74) *Attorney, Agent, or Firm* — Knobbe, Martens, Olson & Bear, LLP

(57) ABSTRACT

A collaborative planning system facilitates sharing of critical plans (e.g., a military mission plan) within an organization and managing authorizations of the plans from reviewers at multiple levels within the organization. Once the plans are approved, a data object representative of the plans is created and stored in an ontology of data objects (with objects of various types and associations between related data objects) so that the plans may be identified as associated with related data objects via searches of the data objects in the ontology.

20 Claims, 12 Drawing Sheets

Manage access
Everyone must meet this Collaborative Plan's security of high and all of 5 group membership ✕

Access
◯ Members  Only members below will have access

Members

🔍 Add people and teams...

| 👤 USER A | ⚠ new | Owner ▽ | ✕ |
| 👤 USER B | | View only ▽ | ✕ |
| 👤 USER C | new | Editor ▽ | ✕ |

410A → USER A
410B → USER B
410C → USER C

Cancel  Save

COLLABORATIVE PLANNING SYSTEM

TECHNICAL FIELD

The present disclosure relates to systems and techniques for data integration, analysis, and visualization. More specifically, the present disclosure relates to a collaborative planning system that may be configured to allow geographically dispersed users to collaboratively create, edit, review and approve collaborative plans, such as operational plans in real-time.

BACKGROUND

Planning systems for creating and editing brief decks are static. For example, brief decks often exist as multiple different versions across multiple computers. Because no single version exists, users have difficulty identifying the most accurate and current version, such as among multiple versions of a plan. This may result in competing versions or information, which hinders the review process for those who may need to review the most complete and updated version.

Furthermore, collaboration is limited due to single user restrictions that allow each user to modify only a local version, without the benefit of collaboration from other users that may be concurrently reviewing and/or updating their own local version of the plan. Thus, geographically dispersed users cannot edit the brief deck in a collaborative manner in real time. Rather, geographically dispersed users who wish to effectuate changes to the brief deck must do so by exchanging versions via email or other similar means. Maintaining a universally accepted updated version that is accessible, editable and reviewable by all users is not possible with existing planning systems.

Additionally, brief decks are not captured in a systematic way for later use by the same or different users in subsequent intelligence or operations. For example, later users cannot search information associated with a brief deck on a universal and standardized platform.

SUMMARY

Embodiments of the present disclosure relate to a data planning and collaboration system (also referred to herein as a "collaborative planning system" or "the system") that may receive data input from one or more users, reviewers, a database, or other source, and present the data to one or more users or reviewers via a user interface for collaborative editing and/or review.

In some embodiments, a collaborative planning system facilitates sharing of critical plans (e.g., a military mission plan) within an organization and managing authorizations of the plans from reviewers at multiple levels within the organization. Once the plans are approved, a data object representative of the plans is created and stored in an ontology of data objects (with objects of various types and associations between related data objects) so that the plans may be identified as associated with related data objects via searches of the data objects in the ontology.

Within the new system, the collaborative plan exists as a single version that is concurrently accessible to multiple users. This eliminates problems associated with version control and simplifies the reviewing process for approval and execution. A new user interface contains features which assist users in routing the completed plan to the necessary personnel for approval and execution. For example, approval status is displayed and controlled directly in software that is used to create and edit the collaborative plan. The system also allows geographically dispersed users to collaboratively input data to populate the collaborative plan in real time and in a standardized manner. The user interface also supports programmable plans wherein users may develop logic to more meaningfully display data that is input into the collaborative plan.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Systems and methods are described for data integration, analysis, and visualization. One innovation includes a method which includes providing an interactive user interface including a data entry pane and a preview pane associated with a collaborative plan, the data entry pane displaying a plurality of data entry fields of the collaborative plan and the preview pane displaying a preview of the collaborative plan, wherein data entry fields of the data entry pane are associated with data display fields of the collaborative plan, receiving input via the data entry fields of values for at least some of the data display fields of the collaborative plan, in response to receiving input via the data entry fields, updating the preview pane of the collaborative plan to include the received values in the associated data display fields of the collaborative plan, receiving input indicating one or more approving users, wherein the received values and the collaborative plan are editable by the approving users, determining approval requirements associated with at least a first approval group of one or more first approving users and a second approval group of one or more second approving users, coordinating approval of the collaborative plan by the first approval group, and in response to approval of the collaborative plan by the first approval group, coordinating approval of the collaborative plan by the second approval group.

Various embodiments include other aspects. The collaborative plan may further include at least one aggregation function which may be configured to set a value of a data display field to the output of an algorithmic calculation on one or more values of data entry fields. The selection of a first data display field in the preview pane may cause selection of a corresponding first date entry field in the data entry pane, and a first value entered in the first data entry field may automatically be displayed in the first data display field. At least some of the data entry fields may be configured to provide a listing of acceptable values for the data entry field. The acceptable values may include values for a particular property of data objects within a database. The method may further include displaying an approval pane including a first status indicator regarding the first approval group and a second status indicator regarding the second approval group. The approval pane may include interface controls configured to allow searching for users and assigning particular users as approving users. The interactive user interface may further include a history pane indicating changes to the collaborative plan by respective approving users. The collaborative plan may be concurrently updated by multiple approving users in response to respective approving users providing values for respective data entry fields of the collaborative plan. The preview pane of the operation plan may be updated in substantially real-time as respective approving users provide values for data entry fields of the collaborative plan. The received input may be indicated in real-time in the data display fields of the collaborative plan viewed by approving users. The approval requirements may include an approval hierarchy indicating a required order of approval by the first approval group and the second approval group. The method may further include in response to approval of the collaborative plan according to the approval requirements, generating a data object associated with the collaborative plan and storing the data object in a database according to an ontology. The data object may be associated with an object definition indicating how the data object is related to other types of data objects. The collaborative plan data object may be associated with person data objects associated with the approving users. The method may further include displaying a graph including nodes representative of data objects and edges between nodes representative of associations between respective data objects.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 4 is an example user interface that may be used to establish and/or update user access rights to a particular collaborative plan.

FIGS. 5-6 are example user interfaces that may be used in creating and/or editing a collaborative plan.

FIG. 7 is an example user interface that may display the history of changes which may be included as a feature of the system.

FIG. 12 is an example user interface useful for creating and editing software in the system.

DETAILED DESCRIPTION

Overview

Figure 1:
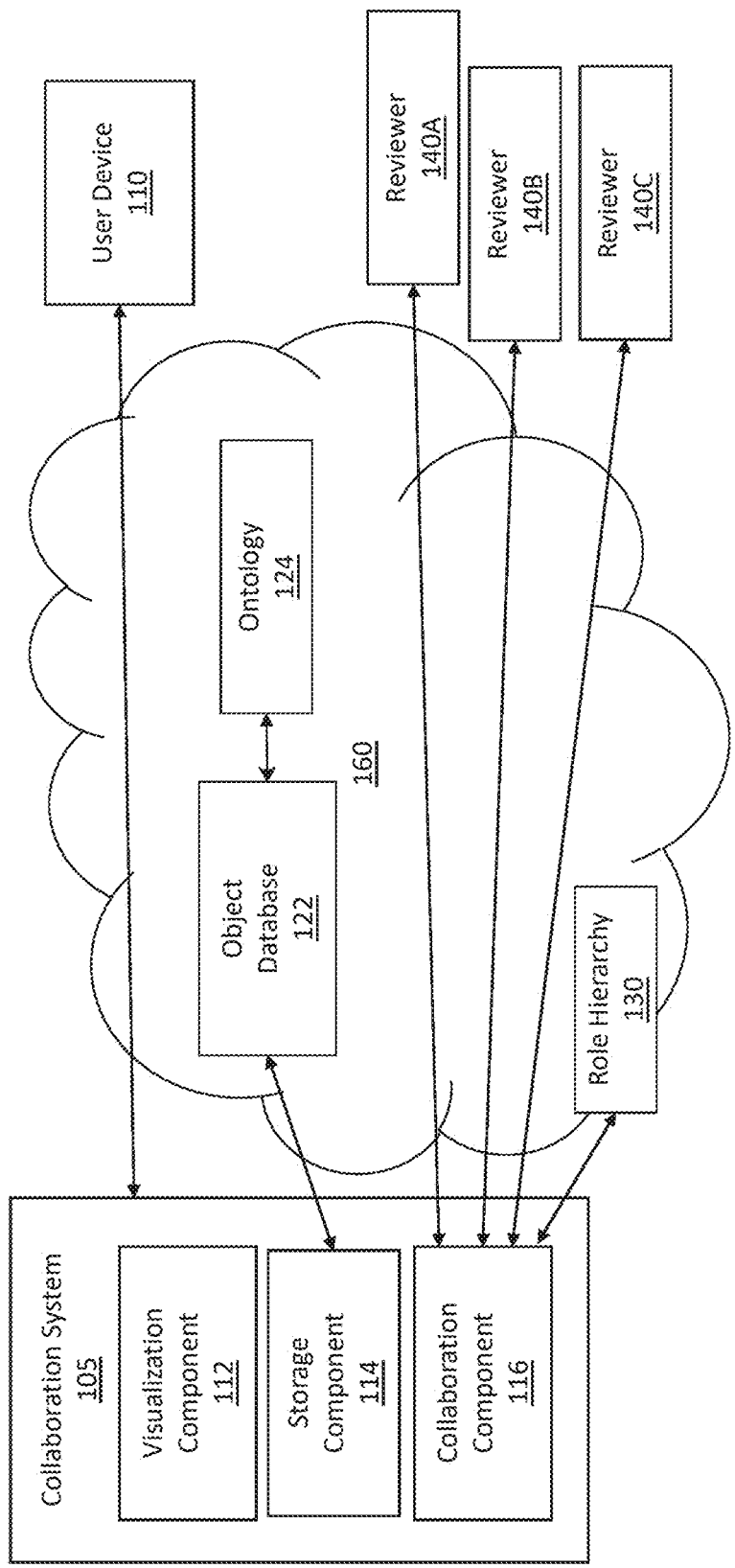
FIG. 1 is a block diagram illustrating an example user device utilizing the collaborative planning system.

Embodiments of the present disclosure relate to a data planning and collaboration system (also referred to herein as a "collaborative planning system" or "the system") that may receive data input from one or more users, reviewers, a database or other source and present the data to one or more users or reviewers via a user interface for collaborative editing and/or review.

A collaborative planning system facilitates sharing of critical plans (e.g., a military mission plan) within an organization and managing authorizations of the plans from reviewers at multiple levels within the organization. Once the plans are approved, a data object representative of the plans is created and stored in an ontology of data objects (with objects of various types and associations between related data objects) so that the plans may be identified as associated with related data objects via searches of the data objects in the ontology.

Within the new system, the collaborative plan exists as a single version that is concurrently accessible to multiple users. This eliminates problems associated with version control and simplifies the reviewing process for approval and execution. A new user interface contains features which assist users in routing the completed plan to the necessary personnel for approval and execution. For example, approval status is displayed and controlled directly in software that is used to create and edit the collaborative plan. The system also allows geographically dispersed users to collaboratively input data to populate the collaborative plan in real time and in a standardized manner. The user interface also supports programmable collaborative plans wherein users may develop logic to generate derived data, for example, that may more meaningfully provide data that is included in the collaborative plan.

Finally, the user interface is interoperable with other software applications that each access a database of objects stored according to an ontology. This allows data (e.g., data objects representing people, places, documents, etc.) from other software applications to be associated with and identified through searching of the database for a collaborative plan. Furthermore, properties of the collaborative plan are captured in a searchable and usable manner, such as by creating a data object representative of a published collaborative plan that is stored in a database with other data objects, such as person, place, transaction, facility, etc. data objects. Thus, relationships between objects of this new collaborative plan data type and other data objects may more easily be identified and analyzed. For example, historical operational data across an enterprise platform may be accessed by those performing subsequent analysis or collaborative planning.

The collaborative planning system discussed herein may be generally useful in situations where a critical plan, such as a military mission plan, would be beneficial to review, for example to ensure the plan will occur or exist according to a desired manner. Furthermore, the collaborative planning system may be particularly useful where the plan occurs in a repeated manner with high frequency and/or the plan is of high importance, for example the plan poses high risks, such as safety risks or financial risks.

Collaborative planning such as operational planning, for example planning, coordinating, and implementing military operations such as military missions is often difficult for lack of collaborative planning in a standardized manner. Implementation of the system described herein may be particularly useful in the context of operational planning of military events, such as military missions. Military events, such as military missions, often pose high risks such as safety risks to military personnel. Furthermore, military events, such as military missions, must often be implemented in a desired manner with high fidelity and thus may require a robust review process. The operational planning of other events, such as financial and/or business investments, entrepreneurial endeavors, implementation of engineering systems or other technical systems, may also benefit from the implementation of the system described herein. For example, the planning required for the construction and/or operation of an oil rig (which may require financial and/or engineering planning) may benefit from the implementation of the system described herein.

The collaborative planning system discussed herein may provide multiple geographically dispersed users the ability to collaboratively create, edit, and/or update a collaborative plan in real-time. The system allows for users to input data or may retrieve data from a database and may further allow for the manipulation or visual display of this data in some manner that is useful to a user. The system allows for a collaborative plan to be reviewed by necessary personnel to ensure the collaborative plan has been created in the desired manner. The system also allows for the data associated with the collaborative plan to be stored in a database according to an ontology such that the data may be later retrieved by the same or different users for analysis or review.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. As discussed further herein, a data object can represent a collaborative plan. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g., a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Collaborative Planning System (Also referred to as "collaboration system" or "the system"): A system to facilitate the creation, sharing, planning and reviewing of collaborative plans, for example, operational plans, such as military operations. May include one or more of the numerous features as discussed herein, such as interactive multimedia content in multiple sections or pages. A collaborative planning system may be configured to store change logs to indicate a history of changes to collaborative plans and may coordinate and track review and approval of collaborative plans.

User: An individual, such as a member of an organization, for example, the military, who uses the collaborative planning system. The user may interact with the system via a user interface to create, share, edit and/or review a collaborative plan.

Reviewer: (Also referred to as "approving user"): An individual or group of individuals who may review a collaborative plan. Reviewers may approve or reject a collaborative plan or comment on a collaborative plan. In some embodiments, a reviewer may be a user and/or take some or all of the same actions as a user.

Collaborative plan: A set of data associated with an idea, strategy, proposal, design, etc. involving multiple entities. More generally, a plan that may require high fidelity and/or may be of high value or high risk and the planning of which may be advantageous to complete in a collaborative manner. A collaborative plan typically includes a combination of content pages or sections, which may each include text, graphics, sound, and/or other audiovisual content. A collaborative plan may be displayed or presented to illustrate details of a collaborative plan, such as a government, military, or corporate operation, for example. A collaborative plan may be stored as a data object that is associated with other data objects according to an ontology.

Page: A portion of a collaborative plan that may be created, shared, edited, presented, reviewed, approved, etc. by users and/or reviewers. A page may include fields for displaying data. A page may be any type of document including a presentation slide or a section of a presentation slide.

Data Entry Field: A user interface element that may be part of a collaborative plan wherein a user may enter or select data for inclusion in the collaborative plan.

Data Display Field: A user interface element that may display data within a collaborative plan. The displayed data may have been entered into the collaborative plan by a user and/or retrieved from an ontology.

History of Changes: A feature of the system that stores changes made to a collaborative plan and allows a user, such as a user or reviewer, to view changes that have been made to the collaborative plan.

Review Chain: A feature of the system that may determine and initiate review of a collaborative plan by one or more reviewers, such as according to a role hierarchy. A review chain may be used to identify which reviewers need to review a collaborative plan, accept or reject the collaborative plan, and/or comment on a collaborative plan.

Template: A preconfigured arrangement of pages and fields, such as data display fields and input fields that may be used to create a collaborative plan. Templates may be created by users and/or engineers, developers and the like, and may be associated with particular types of collaborative plans.

Example System Overview

FIG. 1 is a block diagram illustrating an example user device 110 in communication with a collaborative planning system 105. In this example, the collaboration system 105 comprises a visualization component 112, a storage component 114, and a collaboration component 116. In other embodiments, the collaboration system may include fewer or additional components and/or functions associated with certain components may be performed by other components. In some implementations, some or all of the components 112, 114, 116 are located in the cloud 160 and or at the user device 110.

In general, the visualization component 112 is configured to generate interactive user interfaces for display on the user device 110. As discussed further below, the user interfaces are advantageously interacted with by a user to update information regarding a collaborative plan. The storage component 114 is configured to interact with the object database 122 to store collaborative plans, such as when they are approved, as an object in the database 122. As discussed further below, the collaborative plan objects that are stored in the database 122 may be linked to other object types in the database 122, such as based on associations indicated in the ontology 124. The collaboration component 116 is configured to coordinate and initiate collaboration, review, and approvals from one or more indicated reviewers 140 (which generally includes reviewer 140A, 140B, 140C, or any number of reviewers). For example, the collaboration component 116 may access the role hierarchy 130 to determine reviewers that are associated with a particular role (e.g., a supervisor level within an organization) and then provide indications to the potential reviewers that a proposed collaborative plan is available for their review, comment, and approval (or lack of approval). In some embodiments, the reviewers 140 also execute the collaboration software, such as one or more of the components 112, 114, 116, in a similar manner as the user device 110.

Example Object Centric Data Model

Figure 2:
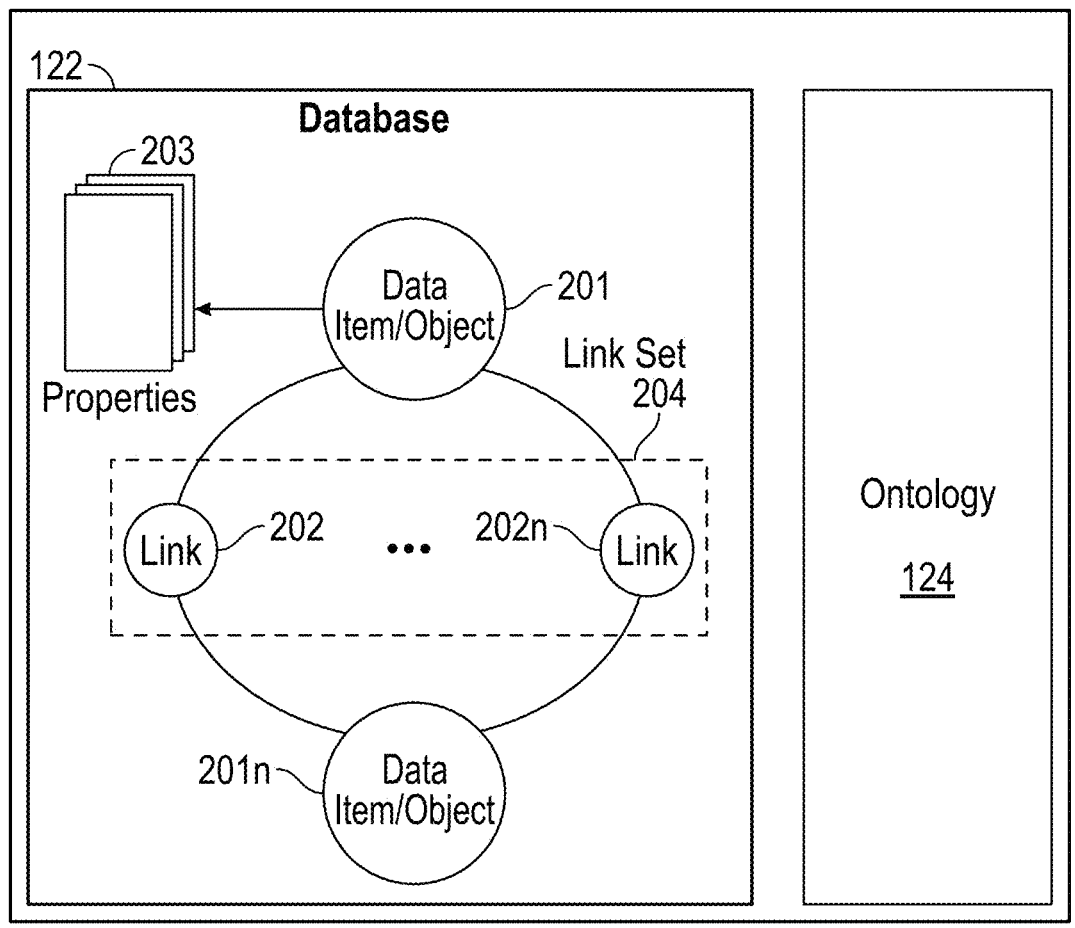
FIG. 2 illustrates an object-centric conceptual data model according to an embodiment.

FIG. 2 is a block diagram of an object-centric conceptual data model according to an embodiment. In some embodiments, a body of data is conceptually structured according to an object-centric data model represented by ontology 124. The conceptual data model is independent of any particular database used for durably storing one or more database(s) 122 based on the ontology 124. For example, each object of the conceptual data model may correspond to one or more rows in a relational database or an entry in Lightweight Directory Access Protocol (LDAP) database, or any combination of one or more databases.

An ontology 124, as noted above, may include stored information providing a data model for storage of data in the database 122. The ontology 124 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Advantageously, the collaborative planning system discussed herein is configured to store collaborative plans as data objects also. Each data object 201 may be associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 124 used by the database 122.

Objects may be instantiated in the database 122 in accordance with the corresponding object definition for the particular object in the ontology 124. For example, a specific monetary payment (e.g., an object of type "event") of US$30.00 (e.g., a property of type "currency") taking place on Mar. 27, 2009 (e.g., a property of type "date") may be stored in the database 122 as an event object with associated currency and date properties as defined within the ontology 124. The data objects defined in the ontology 124 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
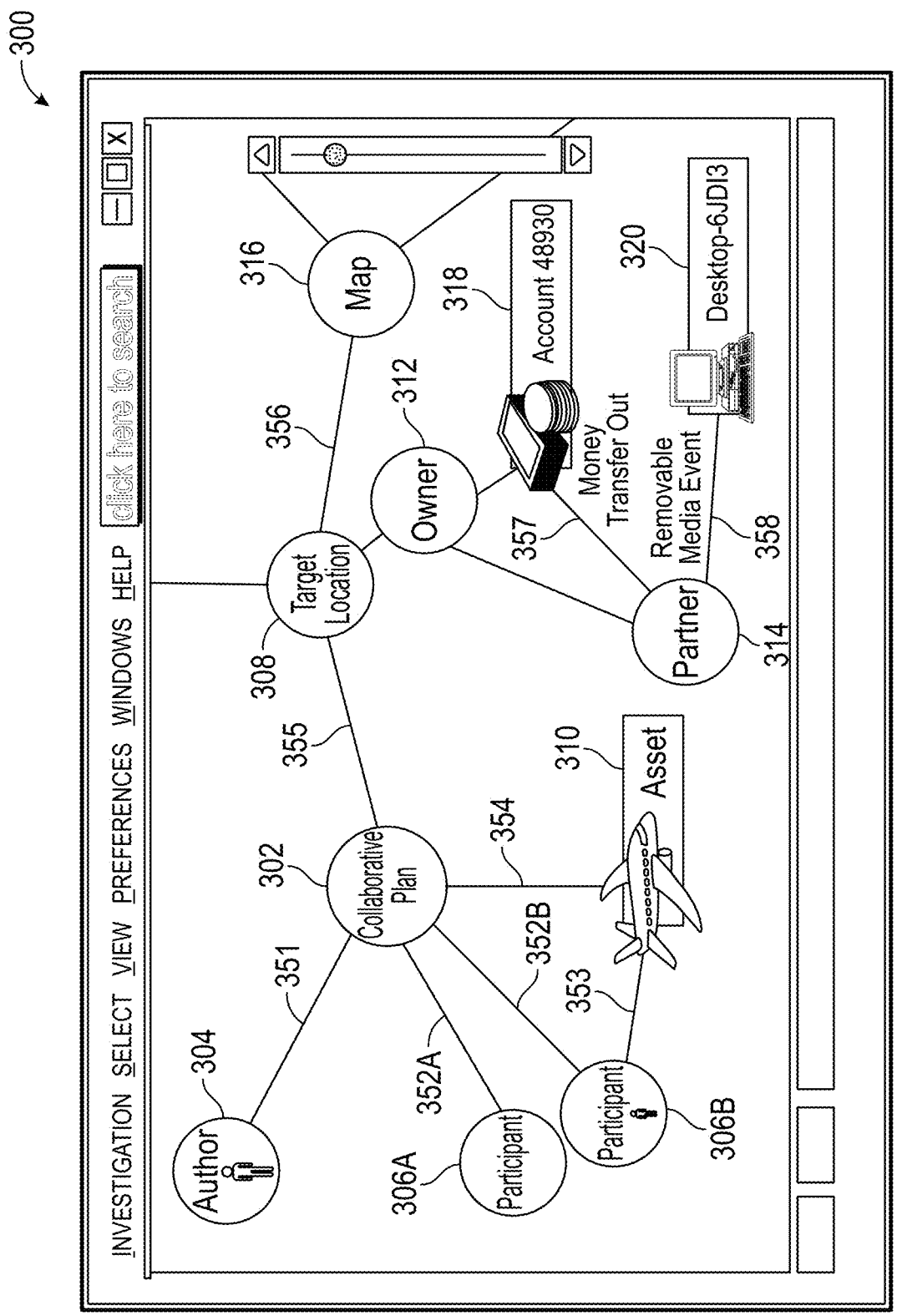
FIG. 3 is an example user interface illustrating a graph representation of relationships between data objects that are represented as nodes.

FIG. 3 is an example user interface illustrating a graph representation 300 of relationships between data objects that are represented as nodes. The graph representation 300 may be generated based on data accessed in the database 122 (FIG. 2), such as in response to a search for information regarding a particular data object. For example, a search for an individual may result in identification of a person object in the database 122 that is linked to a collaborative plan data object, such as by an author or reviewer relationship that is associated with the link. Other objects that are associated with the collaborative plan data object may then be automatically displayed in the graph representation.

In the example of FIG. 3, the illustrated data objects include a collaborative plan object 302, an author object 304, participant objects 306A, 306B, an asset object 310, a target location object 308, an owner object 312, a partner object 314, a map object 316, a financial account object 318, and a computer object 320. In this example, each link between nodes (associated with its corresponding data object), such as between the collaborative plan node 302, participant node 306A, 306B, asset node 310, and target location node 308, indicates some relationship between the linked nodes, such as one or more common property values within the object data.

For example, in FIG. 3, the relationships between collaborative plan data object 302 and participant object 306B is indicated by link 352B, the relationship between participant object 306B to asset data object 310 is indicated by link 353, and the relationship between asset data object 310 and collaborative plan object 302 is indicated by link 354. In this example, the participant data object 306B and the asset data object 310 are associated with the same collaborative plan data object 302. In another example, the relationship between the collaborative plan data object 302 and the author data object 304 is indicated by link 351. In another example, the collaborative plan data object 302 is shown as associated with the target location data object 308 via link 355. In this example, the target location data object 308 is also linked to a map data object 316 via link 356, and the collaborative plan data object 302 is linked to map data object 316 via the target location data object 308. In an embodiment, further details related to the relationships between the various objects may be displayed, such as by the user hovering over or selecting a link or object shown in the graph representation 300. For example, information indicating timing of a money transfer may be illustrated by selection of link 357.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 122 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Example Access Rights

FIG. 4 is an example user interface that may be used to establish and/or update user access rights to a particular collaborative plan. In this example, access rights for three users 410 (including user 410A, 410B, and 410C) are indicated. User 410A is the owner of the collaborative plan, such as the original author of the collaborative plan. In some embodiments, the author may indicate other users that have access to the collaborative plan, such as users 410B and 410C in the example of FIG. 4. In some implementations, other users may establish some or all of the access rights by other users. For example, a supervisor, commander, or other leader may be authorized to establish access rights, while the actual author of the collaborative plan is not. In the example of FIG. 4, user 410B is provided view only rights, while user 410C is provided rights to edit the collaborative plan. In some embodiments, access rights are provided to groups of users, such as all users with a certain rank or position within an organization. Further, access rights may be limited by other criteria, such as by a geographic area of the user.

In the example embodiment as described above, a user can provide access to the collaborative plan via the interface. In some implementations, access may only be given to users with a certain access or security level, such as may be indicated in the role hierarchy 130 (FIG. 1). In some implementations, the collaboration component 116 (FIG. 1) may be configured to automatically determine access rights of users and/or groups based on various criteria, such as author of the collaborative plan, type of collaborative plan, and/or any other properties related to the collaborative plan. In some embodiments, the user can assign access rights to users or groups of users when the collaborative plan is initially created and/or after the collaborative plan has been created. In some embodiments, however, the access rights may not be changeable after they have been initially selected. While FIG. 4 illustrates access rights for a collaborative plan, access rights may be applied to portions of a collaborative plan, such as to one or more specific fields, page, or groups of pages of a collaborative plan.

The access rights settings can include various options for, example, individuals can be granted access to the system or its various features. Likewise, groups of individuals that exist within an enterprise platform can also be selected by the user to be granted access to the system or its various features. The access rights settings can also be configured to allow a user to selectively grant access to members of an enterprise platform or non-members of an enterprise platform. When selecting the access rights settings, a user can search for individuals and/or groups of individuals within the database 122 or role hierarchy 130, for example, according to some identifier such as name, position or address or a user may manually enter the individuals and/or groups of individuals according to some identifier. Access to the system or its features can be configured within the access rights settings to include editing capabilities and/or viewing capabilities.

Example Template Creation

In some embodiments, a collaborative plan (or individual page) may be created from a collaborative plan template (or individual page template), such as templates that are designed, configured, engineered, programmed or created by other users. The various collaborative plan templates can differ in various aspects such as layout and formatting of pages, layout and formatting of fields within the pages, order and number of pages within the collaborative plan, and the like. In some embodiments, a user may configure one or more of the various aspects of the collaborative plan template. In another embodiment, the various aspects of the collaborative plan template are preconfigured such that a user may not configure them.

A user can create a collaborative plan from a collaborative plan template, page templates or any combination thereof. For example, the user could duplicate certain preconfigured pages from a page template to create a collaborative plan. The user could also optionally add preconfigured pages from a page template into an existing collaborative plan template. The user could also optionally delete pages from a preconfigured collaborative plan template. The user could also optionally change the order of pages in a preconfigured collaborative plan template.

Figure 12:
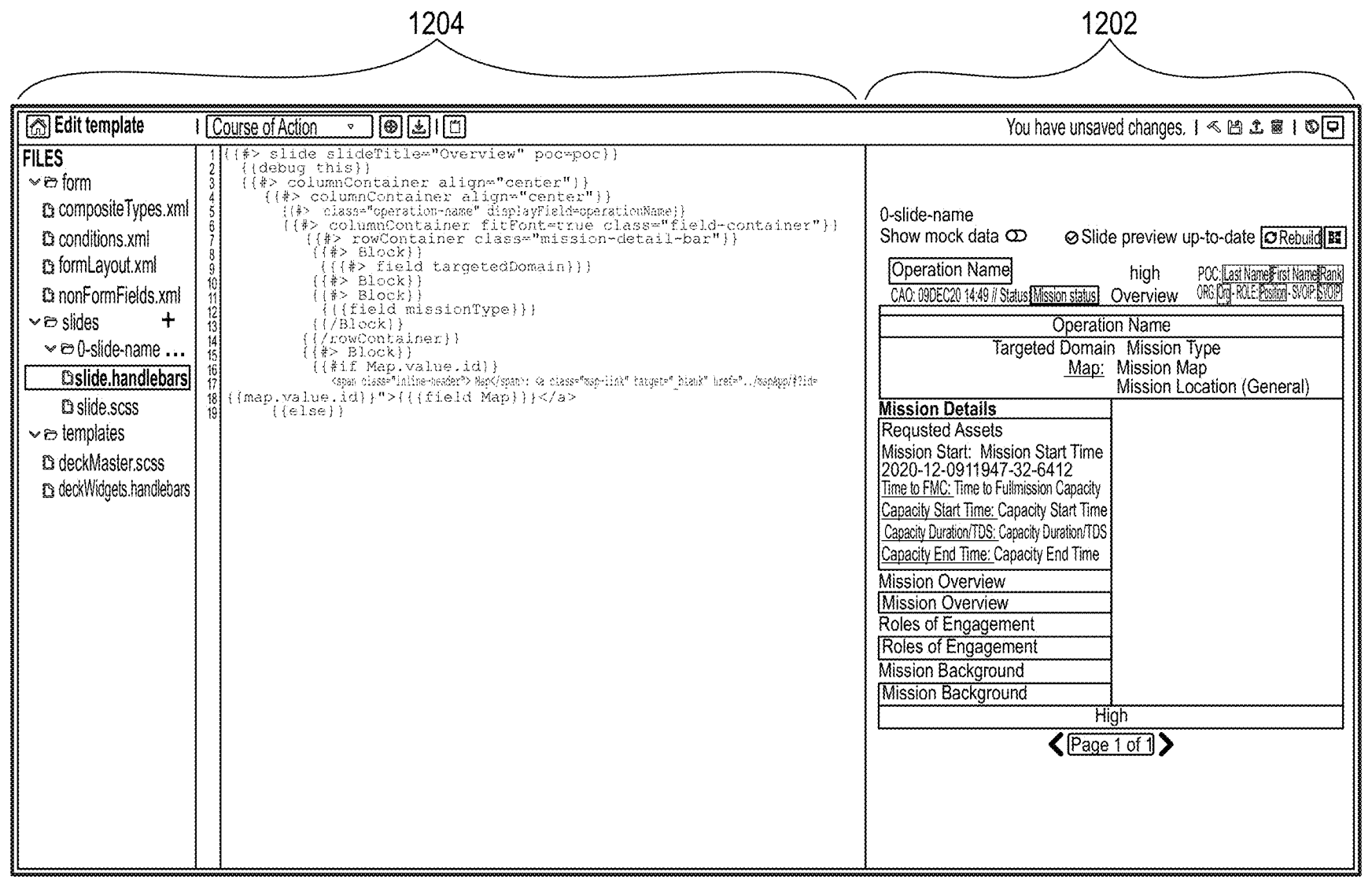

In some embodiments, the collaboration system may include features useful for creating templates of pages and/or collaborative plans. For example, FIG. 12 is an example template creation user interface 1200 that is usable to create and edit templates. In this example, pages of the template are displayed in a preview pane 1202 and code associated with the template is simultaneously displayed in an adjacent code pane 1204. The system may automatically update the collaborative plan preview in pane 1202 as the users makes changes to the codes in pane 1204, so that the collaborative plan preview indicates, in real-time and according to changes made to the code in pane 1204, how the template will be rendered. This side-by-side user interface may allow a user, programmer, or other template creator to more effectively configure and/or create various features of page or collaborative plan templates. A user may be able to navigate to different pages within the collaborative plan and/or template. For example, a user may be able to select buttons or other indicators via the user interface 1200 to navigate to different pages. In some embodiments, the user interface 1200 may display, and the user may select via the user interface 1200, visual indications associated with each of the pages of the collaborative plan and/or template to navigate to a page associated with the selected visual indication.

Figure 11:
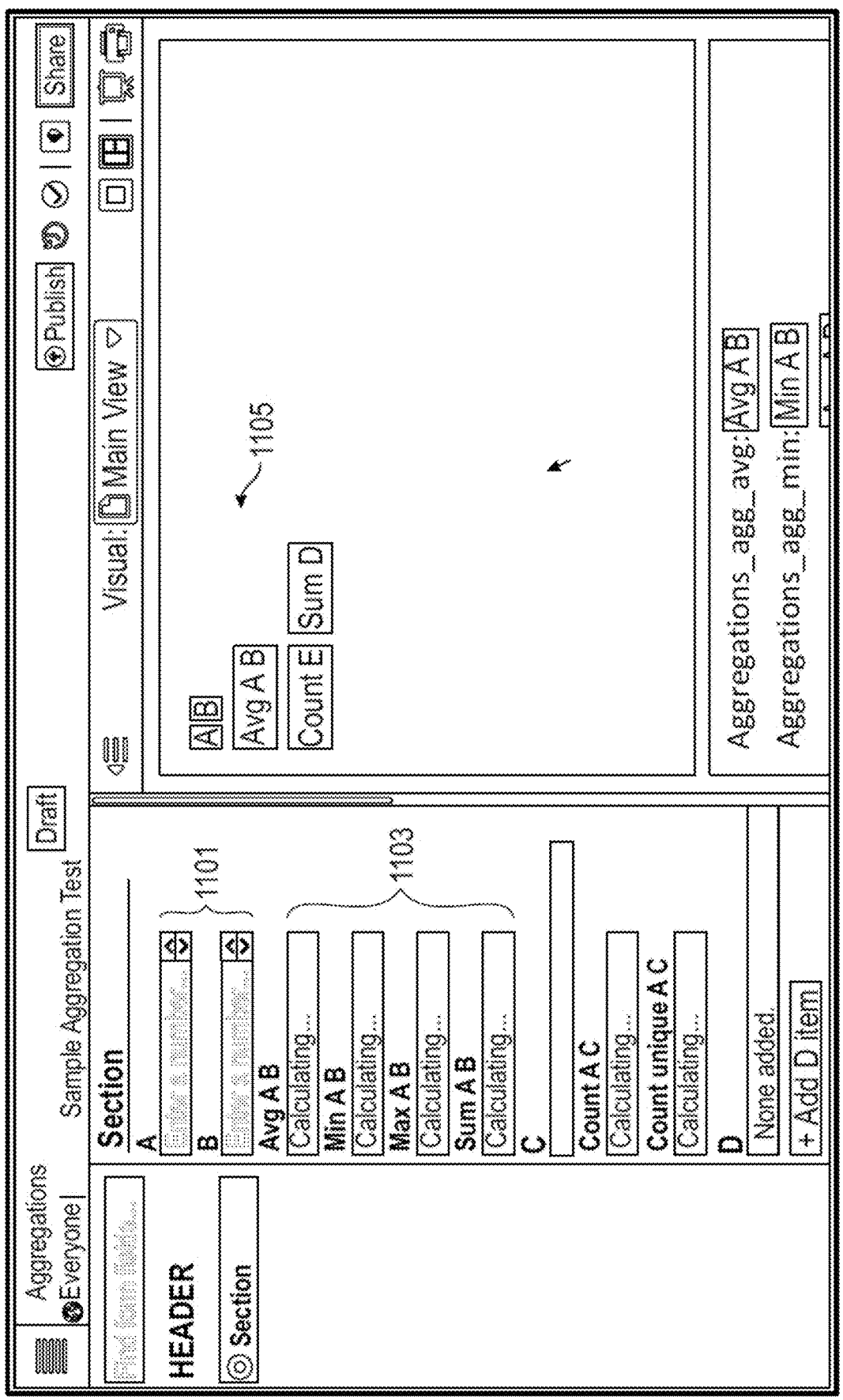
FIG. 11 is an example user interface illustrating example logic and/or functions that the system may perform on the collaborative plan data.

The system can also be configured to receive logic useful for the manipulation or display of data, which may be included in a plan or page template and/or may be provided by a user that is creating the collaborative plan from a template. For example, the interface 600 may be preconfigured with logic or alternatively a user may be able to enter or edit logic, optionally via the user interface, that causes searching functions, calculations on data, or an update to another page (e.g., a cover sheet) of the collaborative plan. FIG. 11 is an example user interface illustrating example logic and/or functions 1103 that may be built into a collaborative plan template. In this example, logic can be included in a template that performs mathematical or statistical operations on other data entered by the users and/or retrieved from a database. In the example of FIG. 11, a user may enter values for A and B in data entry fields 1101 and certain averages and aggregations of the values (and/or other data associated with the entered values) may be calculated and presented in the collaborative plan preview 1105. Other examples of logic may be to categorize data by some metric (such as personnel rank) and/or to perform other calculations/aggregations 1103 on that data 1101, for example, finding totals, averages, minimums, maximums or the like. The output of certain logic that is built into a template may be based on data values on one or more pages of the collaborative plan, with the output displayed on another page, such as a cover sheet of a collaborative plan.

As discussed above, the system may search for and retrieve objects 201 from a database 122 as well as link objects 201 from a database 122 to the data associated with the collaborative plan. The system can be configured to summarize the data and/or objects 201 retrieved from the database 122 in some useful way and can present the data, objects 201 and/or summaries to the user in a visual format, optionally via the interface.

Example User Interfaces for Generating and Revising Collaborative Plans

Figure 5:
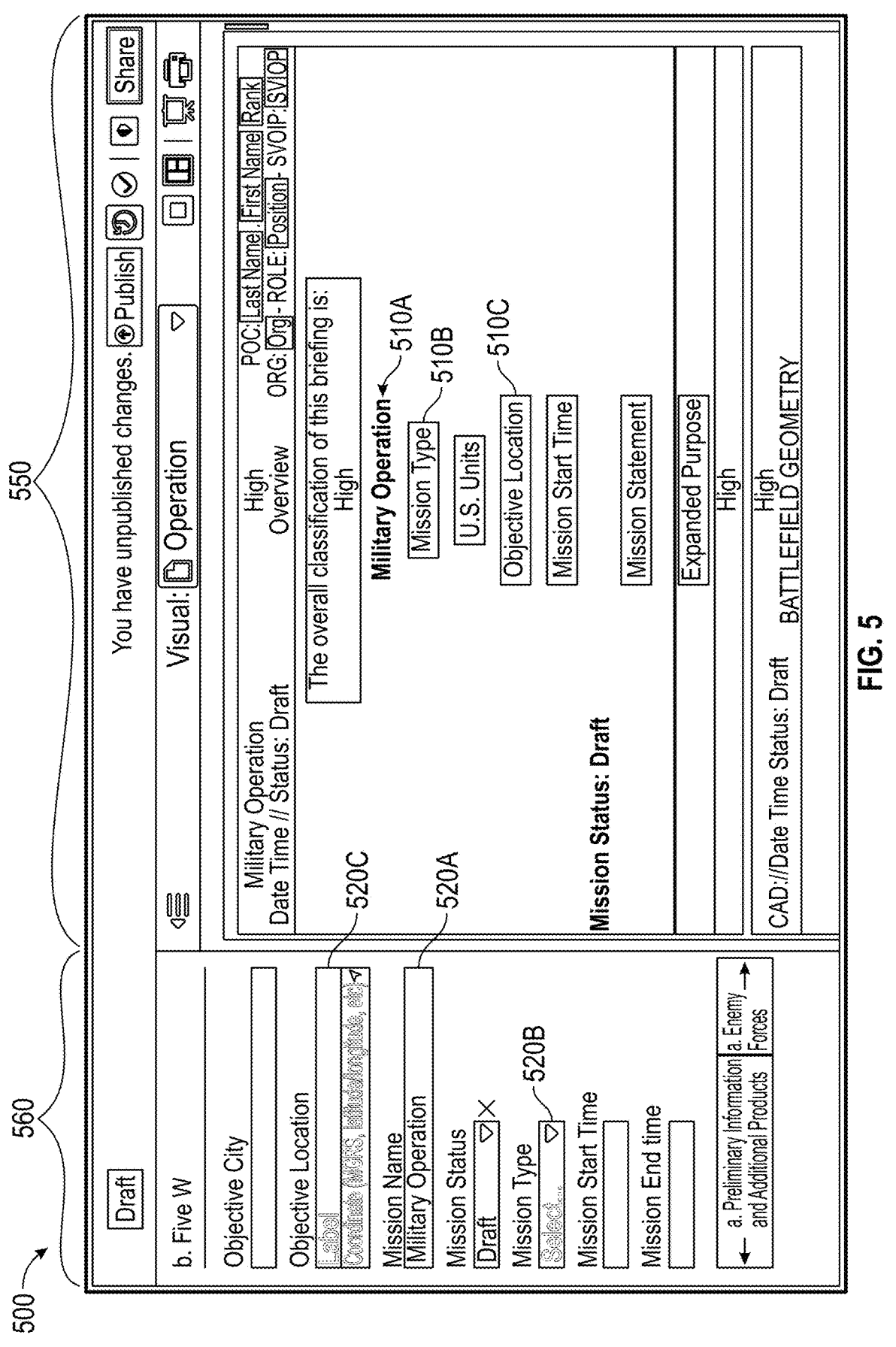

FIG. 5 is an example planning user interface 500 that may be used in creating and/or editing a collaborative plan, such as based on a template collaborative plan. The graphical user interface 500 may be interactive such that a user can interact with the graphical user interface to manipulate the collaborative plan, pages, fields, and/or other features of the collaborative plan. In this example, a collaborative plan preview is displayed in preview pane 550 and information may be provided by the user to data entry pane 560, wherein the preview pane 550 is automatically updated to include any data provided in pane 560 by the user. In this example, the displayed page includes data display fields 510 (including fields 510A, 510B, and 510C) that may display types of information that may be entered by the user to update the collaborative plan. In this example, the data display fields 510 correspond to data entry fields 520 (for example, 520A, 520B, 520C) wherein the user may provide information that will be used to update the display in preview pane 550. For example, a user may enter the name of the mission (such as "Military Operation") in data entry field 520A to cause the name of the mission ("Operation ABC") to appear in the data display field 510A. In this manner, a user may simultaneously input data into the data entry fields 520 and visualize a corresponding update to the data display fields 510 of the pages. The user may navigate to the data entry fields 520 by selecting, via the interface, one of the data entry fields 520 or the data display fields 510 of the pages. For example, a user may navigate to data entry field 520A to enter the mission name by selecting the data display field 510A in the page.

Changes effectuated on the system by a user, such as entering data into the data entry fields 520, can be saved by the storage component 114 to a database in the network 160 and/or to the object database 122. Thus, a plurality of users on the network may see changes to the collaborative plan as changes are made by any of the plurality of users. Furthermore, those users may be geographically distant. For example, a first user in a first geographic location may update the data display field 510C by entering an "objective location" in the data entry field 520C. A second user in a second geographic location, as well as other authorized users, may be able to see that change immediately after it has been made by the first user. In another example, a first user may enter a mission name in data entry field 520A, which may be immediately visualized in data display field 510A by a second user in a location that is geographically distant from the first user. Thus, multiple geographically distant users may simultaneously effectuate changes to the collaborative plan, such as changing, editing or updating the collaborative plan, pages, fields, or review chain.

Figure 6:
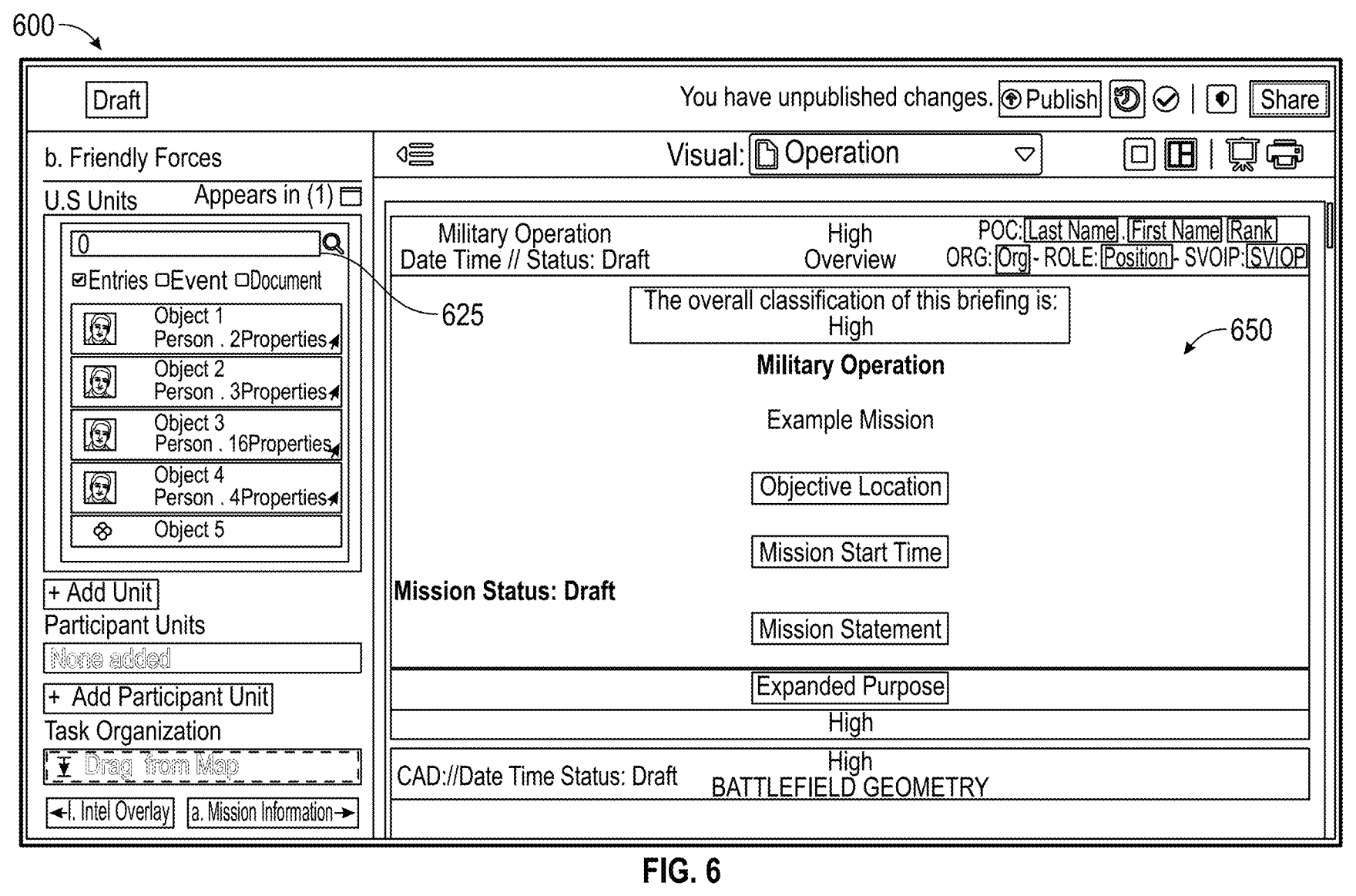

FIG. 6 is another example planning user interface 600 that illustrates additional collaborative plan functionality. As shown in FIG. 6, data fields may be populated based on data from one or more external databases, such as the database 122, the role hierarchy 130, and/or other databases. In some embodiments, a data entry field may be linked to a particular database and date type, and/or other data criteria, when the template is created. Thus, the user creating the collaborative plan using the template may more easily identify the data for entry into the data field. In some embodiments, data that is retrieved to populate the data entry fields 520 may include values from data objects 201, such as from the database 122 (FIGS. 1 and 2). In some implementations, the system may automatically retrieve data (or a limit set of data that may be selected by the user) based on settings, configurations, and/or parameters of the system or collaborative plan. For example, the system may allow the user to search for data that is part of data objects 201 in the database 122 that are linked to data of the collaborative plan according to an ontology 124. In the example of FIG. 6, a search field 625 allows the user to search for "Friendly Forces" that may be added to the collaborative plan, e.g., as Objects 2-5. The system may limit the data objects 201 that may be selected based on characteristics of the data objects, such as a particular type of data object (e.g., the example of FIG. 3 includes asset objects, participant objects, target location objects, and map objects), particular locations of the data objects (e.g., within a specific radius of the operation target location, and/or based on other properties of objects. Once a data object is selected by the user, the interface 600 may display the retrieved data in the data entry field and/or in a data display field of the collaborative plan in preview pane 650. For example, the system may display "Object 1" or "Object 2" etc. as retrieved from the database 122 based on the entered search. The user may select one or more of the displayed search results by selecting them via the user interface. The system may enter the selected data into one or more of the data entry fields 520.

The system may be capable of performing searching functions within the database 122 to locate objects 201, to retrieve the objects 201, and to populate the fields of the pages with those objects 201. The system may be configured with any number of parameters or criteria to use in searching the database 122 for objects 201, for example the system may look for objects 201 that are relevant to the data of the collaborative plan according to some criteria, or are otherwise associated with the data of the collaborative plan. The system may also display properties 203 (such as name, address, the IP etc.) of the objects 201 retrieved from the database 122.

The system may include a variety of features useful for the presentation of the information and data associated with the collaborative plan and/or contained within the collaborative plan. For example, the pages within the collaborative plan, including metadata associated with the collaborative plan such as a review chain or history of changes, can be exported to other programs and to other formats such as Portable Document Format (PDF).

In some embodiments, a user may be able to disable pages (or other portion) of a collaborative plan, which may include hiding the pages from the view of users within the interface. Disabling may include maintaining all information, data, and formatting associated with the page. The system may allow a user to enable any pages that have been previously disabled to restore the page to its normal functionality and viewing abilities with the interface. Enabling and disabling can be performed by a user via the interface. Enabling and disabling of pages can be useful in a variety of situations such as during presentation of the collaborative plan wherein a user may wish to not include certain pages during the presentation. Similar enabling/disabling or hiding functions may apply to other features of the system such as the history of changes or the review chain. A user may also be able to rearrange pages within the collaborative plan. A user may be able to navigate to different pages within the collaborative plan. For example, a user may be able to select buttons or other indicators via the interface to navigate to different pages. In some embodiments, for example as shown in FIG. 5, a user may be able to navigate to different pages of the collaborative plan in a sequential manner by selecting a button or indicator, via the interface, associated with a preceding or subsequent page. In some embodiments, the interface may display, and the user may select via the interface, visual indications associated with each of the pages of the collaborative plan to navigate to a page associated with the selected visual indication.

Figure 7:
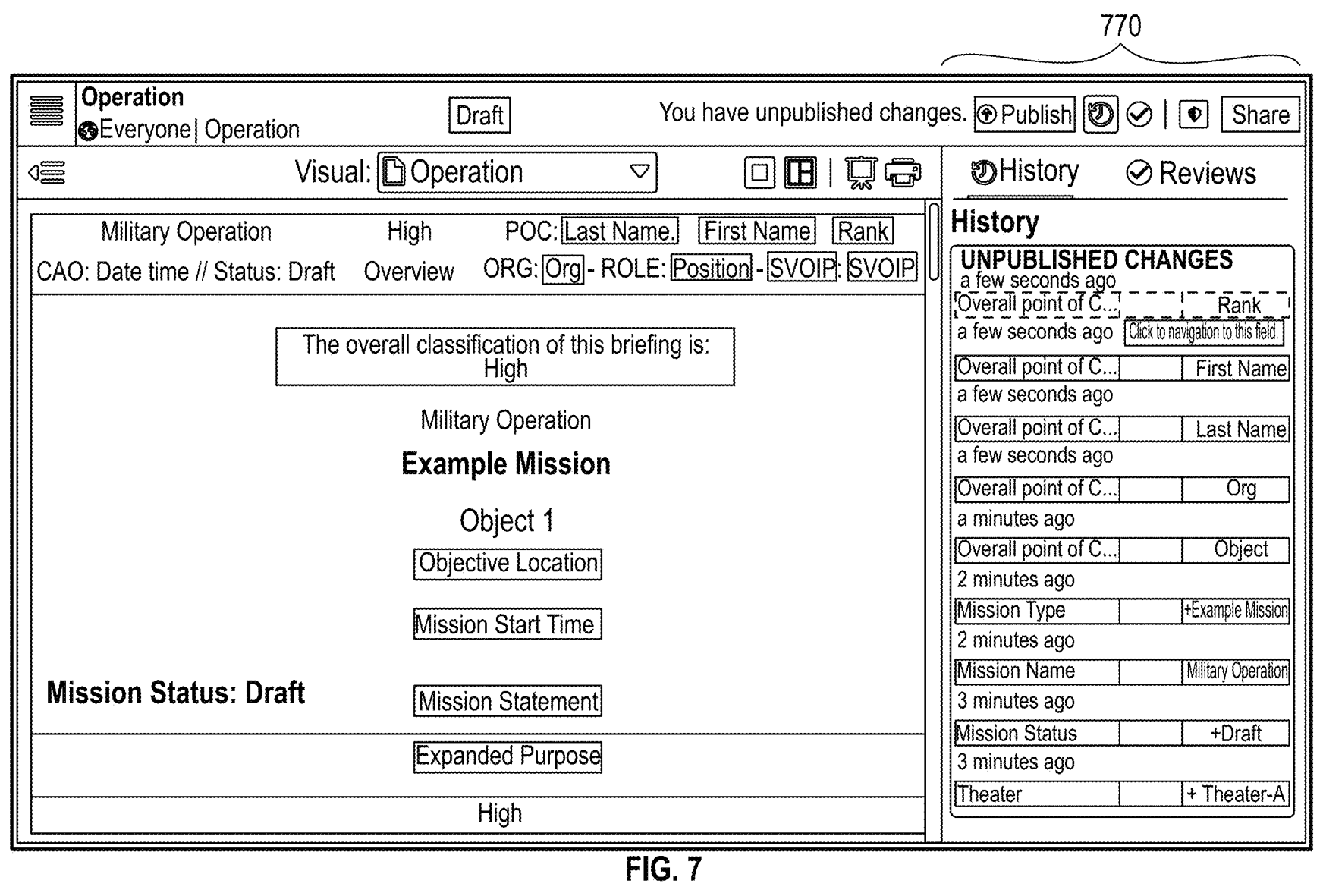

FIG. 7 is an example user interface including a change history pane 770 that indicates changes that have been made to the collaborative plan. The history of changes may display the time of the change, the user that made the change as well as a summary of the change that was made. For example, the history of changes may display that the mission name has been changed to "Military Operation" as well as the time that this change took place and the user that entered this change. The history of changes may also show the status of the change, for example, unpublished or published. The history of changes displayed via the user interface can be selectable to allow a user to navigate to a related data field, such as a data entry field 520 on another page of the collaborative plan. The history of changes may also indicate changes that corresponds to a particular data field over time.

Example Collaborative Plan Review and Approval

The collaborative planning system can coordinate reviews and/or approvals associated with a collaborative plan. For example, certain collaborative plans must be reviewed and/or approved by a particular group of users (or rank/position of users) prior to dissemination (e.g., publication) or implementation of the collaborative plan. In some embodiments, a collaborative plan is stored as a data object in the object database 122 when it reaches a certain level of approval, is published, and/or is finalized. The collaboration component 116 (FIG. 1) thus determines a review chain for a collaborative plan and ensures that only approved collaborative plans (e.g., finalized collaborative plans) are published as objects within the object database 122.

Figure 8:
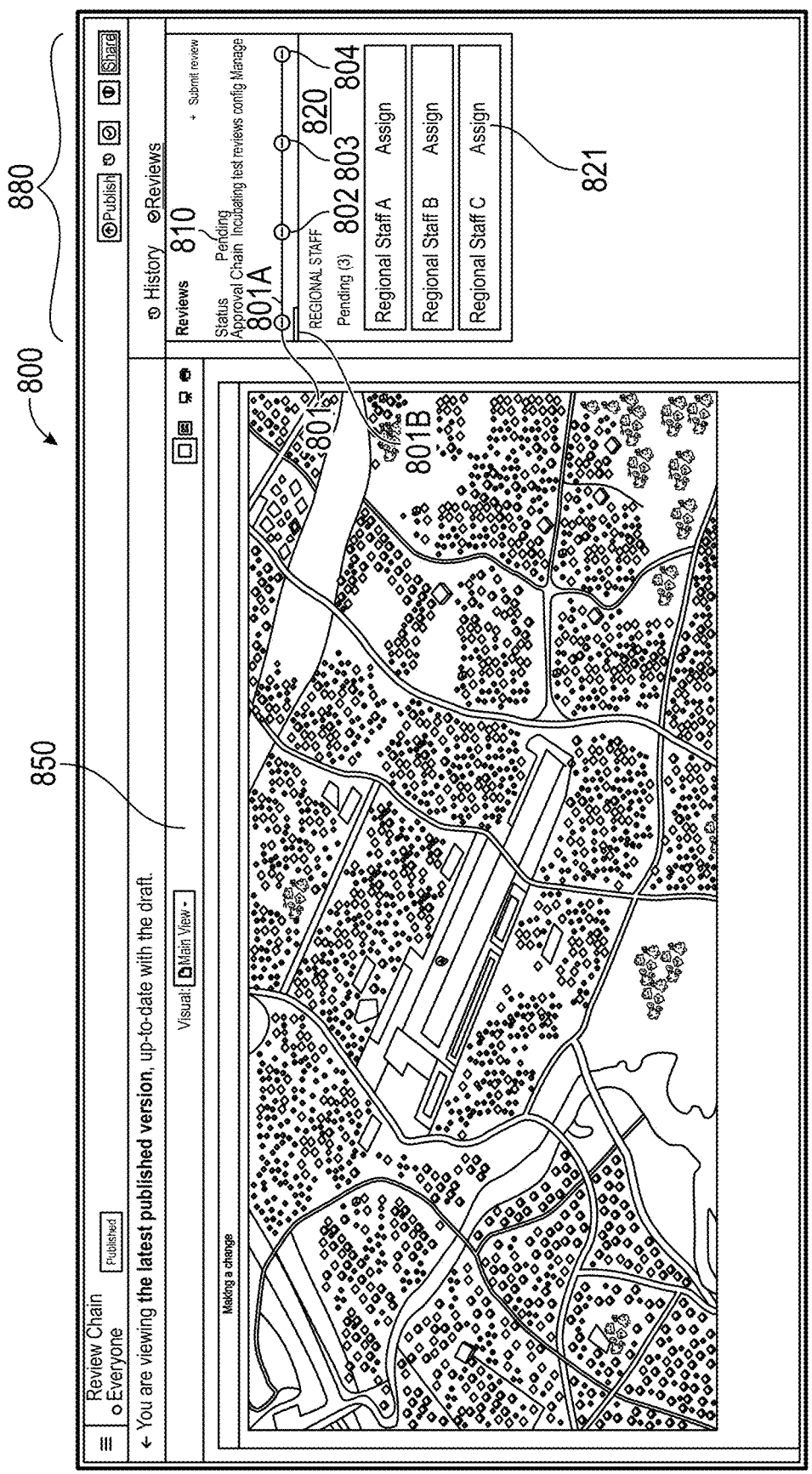
FIGS. 8-9 illustrate an example user interface that may be used to apply a review chain to a collaborative plan.

FIG. 8 illustrates another example user interface 800 that shows a review chain indicating a current state of review and approval of a collaborative plan. In the example embodiment of FIG. 8, the review chain may be displayed in a review pane 880 that is adjacent to a preview pane 850 that displays a preview of a portion of the collaborative plan, which includes a map in this example, but could include any other portion of a collaborative plan. The example review pane 860 indicates various features of the review, including status 810 of the collaborative plan in the review chain, a current review stage (indicated by visual indicator 801A) among various review stages 801-804 of the review chain, and the reviewers associated with the current review stage (or in multiple review stages in certain implementations). In the example FIG. 8, the review chain includes four stages 801-804. The visual indicator 801A associated with the first stage 801 indicates that the collaborative plan is pending at the first stage 801 of the review chain. The visual indicator 801A may additionally indicate the status of the collaborative plan at that stage of the review chain. For example, as shown in FIG. 8, the visual indicator 801A may be a yellow circle with a horizontal line to indicate that the collaborative plan is pending review at the first stage 801 of the review chain.

The review pane 880 may additionally or alternatively display a visual indicator 801B to indicate relevance of features that are displayed in a details portion 820. In this example, a blue bar 801B indicates that the reviews displayed in details portion 820 are associated with the first review stage 801. Other information associated with the displayed stage of the review chain may also be displayed in the details portion 820, such as status, comments, and the like.

A user may select, via the user interface, which stage of the review chain to view in the interface. For example, as shown in FIG. 8, to view information related to the third stage of the review chain, a user may select a visual indicator 803, such as the example gray circle, associated with the third stage of the review chain.

A user may configure the review chain via the review pane 880 of the user interface 800. For example, as shown in FIG. 8, a user may assign reviewers to the various stages of the review chain. The user interface of FIG. 8 illustrates three reviewers (Regional Staff A-C) associated with the first stage of the review chain (as indicated by indicator 801B). Each of these reviewers (Regional Staff A-C) may be an individual or group of individuals. In the example of FIG. 8, a user may assign particular reviewers within the corresponding Regional Staff roles to the review chain. For example, selection of the assign button 821 may cause a reviewer selection interface to pop-up, wherein reviewers with a role of "Regional Staff C" may be selected to perform the review. The review chain can thus be configured to require the review of a single reviewer or a group of reviewers at any given stage within the review chain. In some embodiments, the user can search, via the interactive user interface, for individuals or groups within a database (e.g., the role hierarchy 130) and select them to be reviewers in the review chain. In some embodiments, a user may manually enter reviewers into the review chain and/or the system may automatically populate some or all of the review chain with reviewers.

In some embodiments, a user may specify, for example via the review pane 880, actions that each of the reviewers (or reviewer groups) may take, for example, providing approval of the collaborative plan or commenting on the collaborative plan. A user may specify whether the actions allowed by each of the reviewers is necessary before another action or event may occur. For example, a user may specify whether the approval of a reviewer, such as Regional Staff A, is required before the reviewers of the second stage of the review chain may review the collaborative plan. In some implementations, the collaboration component 116 (FIG. 1) defaults to requiring all necessary approvals in earlier stages before approvals can be provided in later stages. Thus, in the embodiment of FIG. 8, the stage 1 approvals indicated in details 820 (e.g. by Regional staff A, B, and C) may be required before stage 2 reviewers (associated with indicator 802) may provide their approvals. Advantageously, the collaboration component 116 coordinates review and approval request based on the review chain (that is automatically determined by the collaboration component 116 and/or the user) so that later stage reviewers may not be notified of changes to a collaborative plan until they are actually allowed to approve the collaborative plan.

In some embodiments, a review chain may include requirements, such as may be provided by the user, that a reviewer perform an action before the reviewer can approve a collaborative plan. For example, a reviewer may be required to provide a comment prior to approving (or not approving) a collaborative plan. Alternatively, the system can be configured such that a reviewer can take an action, such as submitting a review, at any time, independent of a request for review initiated by the collaboration component 116. The interoperability of the system with the enterprise platform as discussed herein can further allow users, individual reviewers, or groups of reviewers to be notified of certain actions within the review chain, for example when a review has been submitted, when a review has been requested or is required, or when a collaborative plan has been approved.

Figure 9:
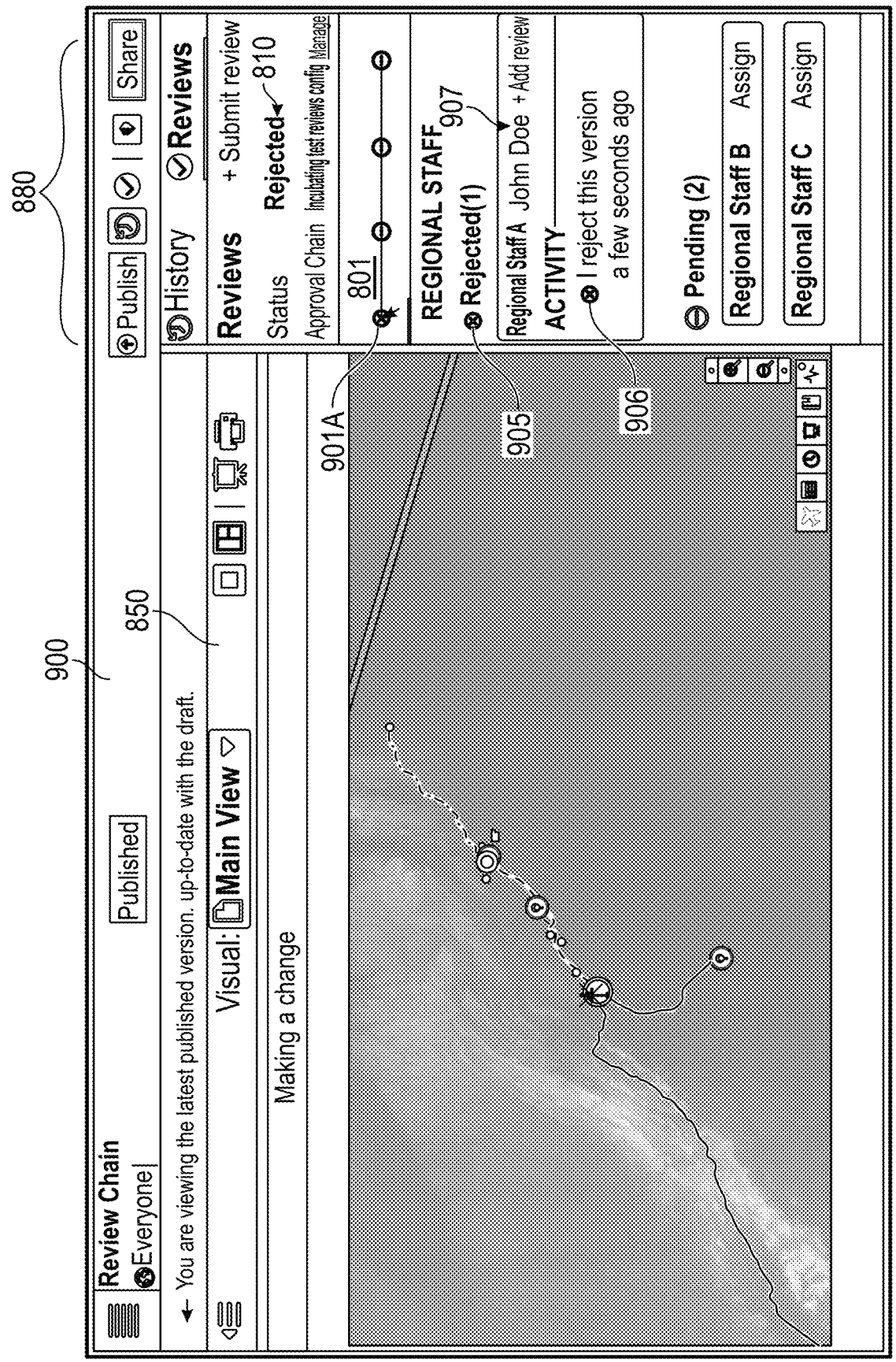

FIG. 9 illustrates another example user interface 900 that also includes the review pane 880 discussed above with reference to FIG. 8, as well as another portion of a collaborative plan depicted in the preview pane 850. In this example, the review pane 880 has been updated in indicate an action taken by the reviewer 907 (e.g., John Doe) associated with the "Regional Staff A" role. As shown in the example of FIG. 9, John Doe, the Regional Staff A reviewer, has rejected the collaborative plan. The system may display this rejected status indicator 905 in the review pane 880, and include any other rejections of the collaborative plan under the Rejected status indicator 905. With the rejection by Regional Staff A, the collaborative plan overall status 810 is updated to indicate that the plan is "rejected." In this example, activity of reviewers, such as a comment 906 submitted by John Doe, are displayed, along with the action and the time the action was taken.

As discussed with reference to FIG. 8, the system may display any number of visual indicators associated with the actions of the reviewers. In the example FIG. 9, the review pane 880 includes a red circle and "X" indicator 901A associated with the stage 1 review of the collaborative plan, which indicates that at least one reviewer rejected the collaborative plan. If the proposal was approved by all of the reviewers at stage 1, the indicator may indicate approval with a green circle and a check mark indicator. The visual indications may allow reviewers and users to visualize the status of the collaborative plan within the review and/or approval process. This additionally may allow reviewers and users to visualize previous actions taken by reviewers such as comments 906 that have been submitted or status 810 of the collaborative plan or review activities associated with particular statuses, such as rejected status 905. This may be useful when visualizing the review chain and the history of changes, alongside a preview pane 850 showing portions of the collaborative plan. As discussed above with other features of the system, reviewers can perform actions on the review chain such as submitting reviews and/or approvals from locations that are geographically distant from other reviewers or users. In this manner, all reviewers and/or users on the network can see the updates and changes to the review chain in real-time.

As discussed in more detail below with reference to FIG. 10, review chains may be automatically generated and/or customized by users of the collaboration system. For example, a review chain may be configured to require review and approval of multiple people or only 1 person. A review chain could also be configured to require review and approval of multiple people in a sequential manner and/or in a certain order thus preventing review of subsequent reviewers until all prior reviewers have reviewed and/or approved.

Multiple different review chains may be configured within the system for a single collaborative plan or alternatively only a single review chain may be configured for a collaborative plan. In some embodiments, a user and/or reviewer may configure, edit, or update one or more review chains within the system for the collaborative plan. In another embodiment, the system has one or more preconfigured review chains such that the user and/or reviewer cannot edit, update or change the preconfigured review chain. Where the system has preconfigured review chains, the user can select one or more of the preconfigured review chains to apply to the collaborative plan, or alternatively the system may automatically select one or more of the preconfigured review chains to apply. In some embodiments, the user and/or reviewer can edit the review chain after it has been configured. For example, a user and/or reviewer can add an additional reviewer to the review chain not in the initially configured review chain.

Configuration of the review chain can include creating various stages or levels of review, specifying the required sequence of review through the various stages, assigning reviewers to the stages, specifying the approvals that are required at the various stages for the collaborative plan to be approved, and specifying actions that may be taken upon approval of the collaborative plan. In some implementations, the levels of review may be determined based on the role hierarchy 130 (FIG. 1), which may generally indicate an organizational structure of an organization, such that the appropriate review levels may be included in a review chain.

Upon approval of a collaborative plan, such as by the required reviewers at each stage of the review chain, actions, such as publication of the collaborative plan, storage of the collaborative plan as a data object in the object database 122 may be performed, and/or creation of a final version of the collaborative plan. The collaborative plan data object may be automatically linked to other data objects of various types within the collaborative plan and/or associated with those data objects (such as discussed above with reference to FIGS. 2-3).

Configuration of the review chain may also include specifying which actions the reviewers may take. A user may specify the actions a reviewer may take, or the system may automatically specify the actions a reviewer may take. The review chain may be configured such that each reviewer in the chain can only take the same action or actions, or the review chain may be configured to allow different reviewers within the review chain to take different actions. A reviewer may take such actions as submitting various statuses of the collaborative plan and/or comments. For example, a reviewer can apply an approval or rejection status to the collaborative plan. A reviewer may also submit a comment, perhaps in addition to their approval or rejection status. The review chain can be configured to allow reviewers to approve or reject the entire collaborative plan or portions thereof such as individual pages of the collaborative plan, or fields of the pages.

Figure 10:
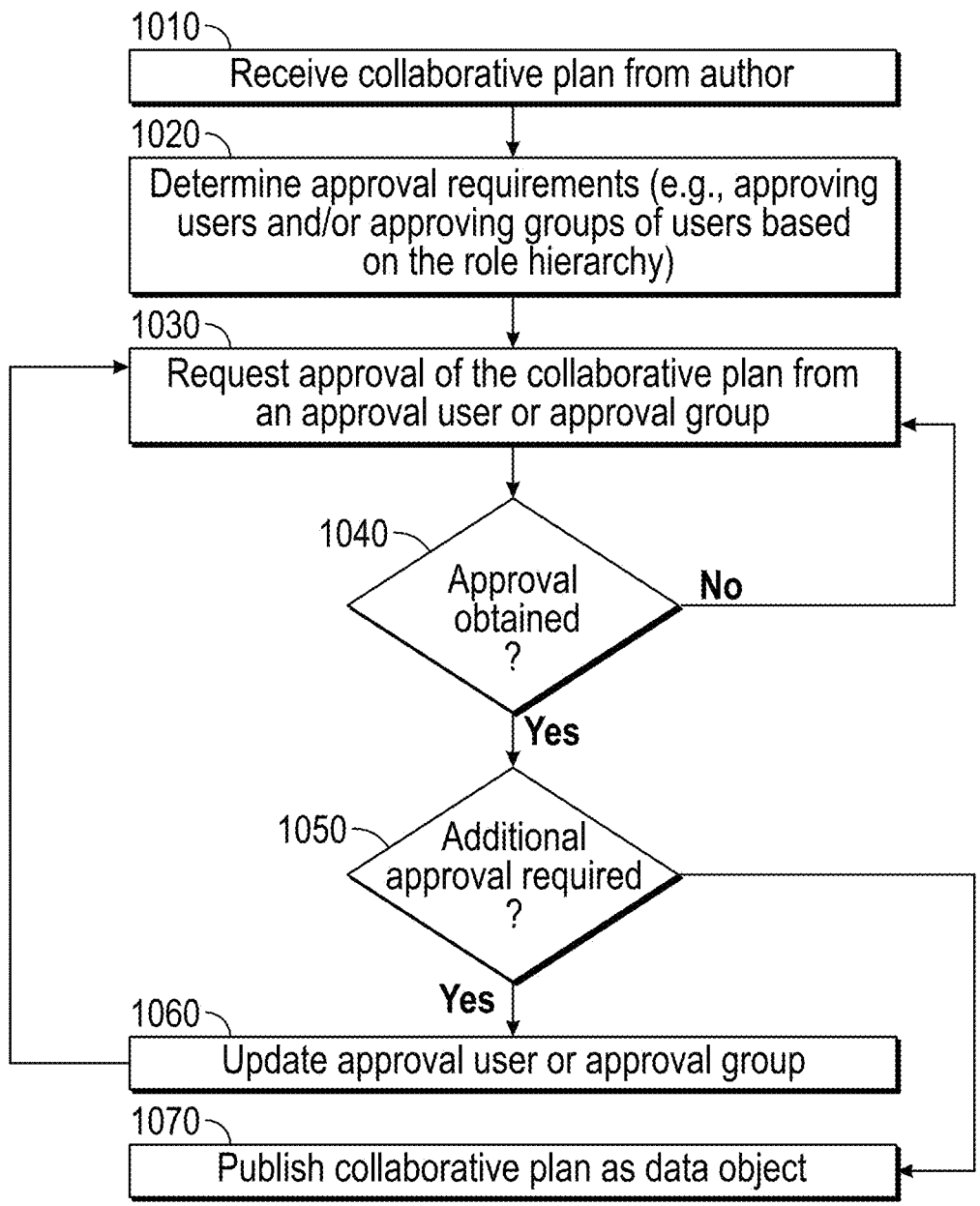
FIG. 10 illustrates an example flow chart of a review chain.

FIG. 10 is a flowchart illustrating one embodiment of a method of managing review of a collaborative plan, such as may be performed by the collaboration component 116 of FIG. 1. Depending on the embodiment, the method of FIG. 10 may include fewer or additional blocks and the blocks may be performed in an order that is different than illustrated.

Beginning at block 1010, the collaboration component 116 is notified of a collaborative plan from an author that is ready for review, such as at a time that is specified by the author or other user.

At block 1020, the system (e.g., the collaboration component of the collaboration system) may determine approval requirements for the collaborative plan. For example, the system may determine who the reviewers (approving users and/or groups of users) are to be for the collaborative plan. This determination may be based on the role hierarchy of the reviewers, or it may be based on review specification provided by the user. For example, a review chain for a collaborative plan may be automatically determined to include approval requirements at multiple role levels within a role hierarchy, such as approvals that begin at the user's role level and move upward to one or more higher role levels (e.g., the final decision makers).

Moving to block 1030, the system requests approval of the collaborative plan or portions thereof from one or more reviewers that are currently able to provide approval. For example, stage 1 reviewers may initially receive a notification regarding the collaborative plan, and reviewers at later stages (e.g., stage 2) may not receive a notification until after the stage 1 reviewers have approved the collaborative plan. In some implementations, the system requests approval of the collaborative plan or portions thereof from reviewers in one or more stages at the same time. For example, reviewers at later stages (e.g., stage 2) may receive a notification regarding the collaborative plan at the same time as reviewers in preceding stages (e.g., stage 1).

Next, at block 1040, the system determines if the required approval from the reviewers at the current review stage has been obtained. As noted above, the required approval may change depending on the configuration of the review chain. For example, the review chain may be configured to require that approval be obtained from each of the reviewers in a stage of the review chain or from only a certain quantity of reviewers in a stage of the review chain. The review chain may be configured to require approval for the entire collaborative plan and/or for individual pages or fields of a collaborative plan. In some implementations, the review chain may be configured to require an action from a reviewer (e.g. leaving a comment) in addition to, or in place of, approval. In some implementations, the required approval may be based on the number of rejections from reviewers. For example, the review chain may be configured to require that less than a certain number of reviewers reject the collaborative plan or portions thereof. If the required approval has not been obtained, the method returns to block 1030 where additional request for review and approval may be transmitted. In some embodiments, if approvals are not obtained in a certain time and/or after a certain number of requests to the reviewers, the particular reviewers assigned to provide the review may be changed to other reviewers at the same or higher role level within the organization.

If the required approval has been obtained at block 1040, the system may check the review chain to determine whether additional approvals are required at block 1050. Additional approvals may be required at block 1050 if, for example, the review chain has been configured with an additional stage and/or an additional reviewer not in the review chain. Additional approvals may be required at block 1050 if, for example, the collaborative plan has been edited, updated or changed by a user and/or reviewer after having obtained approval at block 1040. If additional approvals are required (e.g., by another stage of reviewers in the review chain), the system updates the reviewer (approval user or approval group) at block 1060 and returns to block 1030 where review and approval is requested from the updated group of reviewers.

If, at block 1050, the system determines that additional approvals are not required, the method continues to block 1070 where a data object associated with the collaborative plan is created and stored as a data object 201 in the object database 122. The system may additionally or alternatively publish individual portions of the collaborative plan as data objects 201 to the object database 122. Publishing to the object database 122 at block 1070 may be according to an ontology 124. The system may additionally link the collaborative plan data object with other data objects 201 that are in the object database 122, such as based on overlapping properties of the objects (e.g., see FIGS. 2-3).

As discussed above, stages of a review chain can correspond to authoritative positions, such that reviewers in subsequent stages of the review chain are of higher authority than reviewers in preceding stages of the review chain.

Example Structured Data Capture

Data Objects associated with a collaborative plan may be published to the database 122 as one or more objects 201 according to an ontology 124. For example, the collaborative plan can be published as an object 201 in the database 122. Additionally, fields within the pages of the collaborative plan may also be published as objects 201 within the database 122.

Data within the system that is associated with the collaborative plan may be published as various types of objects 201 in the database 122. For example, the collaborative plan may become a collaborative plan, mission, or event object type. Additionally, fields within pages of the collaborative plan may cause linking to and/or generation of additional data objects in the database 122. For example, information regarding an individual identified in a collaborative plan may be used to link to an existing person object in the database 122, or if an existing user is not located in the database 122, a new person object for the individual may be created, stored in the database, and linked to the collaborative plan. In some embodiments, a user may specify the type or types of objects 201 that are to be created from the collaborative plan or its associated data. The object types may additionally or alternatively be preconfigured into the collaborative plan template or page templates from which a user may select to create the collaborative plan. For example, a user may select a mission collaborative plan template such that a mission object 201 can be created in the database 122 from that collaborative plan.

As discussed above, the system may automatically link objects 201 that have been created from the collaborative plan or its associated data according to an ontology 124. These links 202 may be created between one or more objects 201 created from the collaborative plan or its associated data or between one or more objects 201 of the former to one or more pre-existing objects 201 in the database 122 according to an ontology 124. The system may allow a user to specify the links 202 to be created between objects 201 or may automatically create links 202 according to criteria or parameters of associations and relationships between data of the collaborative plan and/or data of the database 122.

The creation of objects 201 and their associated links 202 in a database 122 according to an ontology 124 allows for the data to be maintained in an enterprise platform of products in a standardized manner. For example, objects 201 that have been created within the database 122 from data associated with the collaborative plan can be searched and retrieved from the database 122 by the same system as described herein, or by other systems or products, and by the same or different users than those initially involved with their creation. In this manner, the collaborative planning of things or events such as military missions, allows for later analysis and review of the collaborative plan. This can be useful in the context of military missions which often require analysis of previous missions or events that are related to the present mission in some way.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages.

Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method comprising:
providing an interactive user interface including a data entry pane and a preview pane associated with a collaborative plan,
the data entry pane displaying a plurality of data entry fields of the collaborative plan; and
the preview pane displaying a preview of the collaborative plan, wherein data entry fields of the data entry pane are associated with data display fields of the collaborative plan;
receiving input values via the data entry fields for at least some of the data display fields of the collaborative plan;
in response to receiving the input values via the data entry fields, updating the preview pane to include the input values in associated data display fields of the collaborative plan;
providing one or more preconfigured review chains for user selection, wherein the one or more preconfigured review chains comprise one or more approving users based on a role hierarchy;
receiving selection via the interactive user interface of a preconfigured review chain to apply to the collaborative plan;
responsive to selection via the interactive user interface to update the selected preconfigured review chain, displaying one or more potential approving users having a common role type within the role hierarchy;
receiving selection via the interactive user interface of a selected approving user from among the one or more potential approving users;
updating the selected preconfigured review chain with the selected approving user;

determining approval requirements associated with at least a first approval group of one or more first approving users and a second approval group of one or more second approving users, wherein at least some of the one or more first approving users are not included in the second approval group;

coordinating a first approval of the collaborative plan by the first approval group;

in response to the first approval of the collaborative plan by the first approval group, coordinating a second approval of the collaborative plan by the second approval group; and updating a history pane within the interactive user interface to indicate a change to the collaborative plan by the one or more approving users, a time the change was made to the collaborative plan, and an approving user who made the change to the collaborative plan.

2. The method of claim 1, wherein the collaborative plan includes at least one aggregation function configured to set a value of a data display field to an output of an algorithmic calculation on one or more values of data entry fields.

3. The method of claim 1, wherein selection of a first data display field in the preview pane causes selection of a first data entry field in the data entry pane, wherein a first value entered in the first data entry field is automatically displayed in the first data display field.

4. The method of claim 1, wherein at least some of the data entry fields are configured to provide a listing of acceptable values for the data entry field.

5. The method of claim 4, wherein the acceptable values include values for a particular property of data objects within a database.

6. The method of claim 1, further comprising:
displaying an approval pane including a first status indicator regarding the first approval group and a second status indicator regarding the second approval group.

7. The method of claim 6, wherein the approval pane includes interface controls configured to allow searching for other approving users to assign within the preconfigured review chain.

8. The method of claim 1, wherein the collaborative plan is concurrently updated by multiple approving users in response to respective approving users providing values for respective data entry fields of the collaborative plan.

9. The method of claim 8, wherein the preview pane of the collaborative plan is updated in substantially real-time as respective approving users provide values for data entry fields of the collaborative plan.

10. The method of claim 1, wherein the received input is indicated in real-time in the data display fields of the collaborative plan viewed by approving users.

11. The method of claim 1, wherein the approval requirements include an approval hierarchy indicating a required order of approval by the first approval group and the second approval group.

12. The method of claim 1, further comprising:
in response to approval of the collaborative plan according to the approval requirements, generating a collaborative plan data object associated with the collaborative plan and storing the collaborative plan data object in a database according to an ontology.

13. The method of claim 12, wherein the collaborative plan data object is associated with an object definition indicating how the collaborative plan data object is related to other types of data objects.

14. The method of claim 12, wherein the collaborative plan data object is associated with person data objects associated with the approving users.

15. The method of claim 12, further comprising:
displaying a graph including nodes representative of data objects and edges between nodes representative of associations between respective data objects.

16. The method of claim 1, wherein the input in the data entry fields comprises text input.

17. A computing system comprising:
a hardware computer processor; and
a non-transitory computer readable medium having software instructions stored thereon, the software instructions executable by the hardware computer processor to cause the computing system to perform operations comprising:
providing an interactive user interface including a data entry pane and a preview pane associated with a collaborative plan,
the data entry pane displaying a plurality of data entry fields of the collaborative plan; and
the preview pane displaying a preview of the collaborative plan, wherein data entry fields of the data entry pane are associated with data display fields of the collaborative plan;
receiving input values via the data entry fields for at least some of the data display fields of the collaborative plan;
in response to receiving the input values via the data entry fields, updating the preview pane to include the input values in associated data display fields of the collaborative plan;
providing one or more preconfigured review chains for user selection, wherein the one or more preconfigured review chains comprise one or more approving users based on a role hierarchy;
receiving selection via the interactive user interface of a preconfigured review chain to apply to the collaborative plan;
responsive to selection via the interactive user interface to update the selected preconfigured review chain, displaying one or more potential approving users having a common role type within the role hierarchy;
receiving selection via the interactive user interface of a selected approving user from among the one or more potential approving users;
updating the selected preconfigured review chain with the selected approving user;
determining approval requirements associated with at least a first approval group of one or more first approving users and a second approval group of one or more second approving users, wherein at least some of the one or more first approving users are not included in the second approval group;
coordinating a first approval of the collaborative plan by the first approval group;
in response to the first approval of the collaborative plan by the first approval group, coordinating a second approval of the collaborative plan by the second approval group; and
updating a history pane within the interactive user interface to indicate a change to the collaborative plan by the one or more approving users, a time the change was made to the collaborative plan, and an approving user who made the change to the collaborative plan.

18. The computing system of claim 17, wherein the input in the data entry fields comprises text input.

19. The computing system of claim 17, wherein selection of a first data display field in the preview pane causes selection of a first data entry field in the data entry pane, wherein a first value entered in the first data entry field is automatically displayed in the first data display field.

20. The method of claim 1, wherein the history pane further indicates a status of the change to the collaborative plan, the status comprising unpublished or published.

\* \* \* \* \*